US012633976B2

(12) United States Patent
Kotamraju et al.

(10) Patent No.: US 12,633,976 B2
(45) Date of Patent: May 19, 2026

(54) RANK CONTROL FOR MITIGATING REFERENCE SIGNAL IMPACT WITH ANTENNA SHARING

(71) Applicant: QUALCOMM Incorporated, San Diego, CA (US)

(72) Inventors: Saisruthi Kotamraju, Bengaluru (IN); Manav Lnu, Hyderabad (IN); Ashutosh Vinod Agrawal, Bengaluru (IN); Sriram Sridharan, San Diego, CA (US); Brian Clarke Banister, San Diego, CA (US); Touseef Khan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 18/554,366

(22) PCT Filed: Jun. 13, 2022

(86) PCT No.: PCT/US2022/072899
§ 371 (c)(1),
(2) Date: Oct. 6, 2023

(87) PCT Pub. No.: WO2022/266599
PCT Pub. Date: Dec. 22, 2022

(65) Prior Publication Data
US 2024/0243787 A1 Jul. 18, 2024

(30) Foreign Application Priority Data

Jun. 18, 2021 (IN) .............................. 202141027293

(51) Int. Cl.
*H04B 7/04* (2017.01)
*H04B 7/0456* (2017.01)
(Continued)

(52) U.S. Cl.
CPC ......... *H04B 7/0486* (2013.01); *H04B 7/0604* (2013.01); *H04B 7/0691* (2013.01); *H04B 7/0822* (2013.01)

(58) Field of Classification Search
CPC .. H04B 7/0486; H04B 7/0604; H04B 7/0691; H04B 7/0822
(Continued)

(56) References Cited

U.S. PATENT DOCUMENTS

2016/0119942 A1* 4/2016 Wang ................ H04W 72/1215
370/336
2016/0301456 A1* 10/2016 Clevorn ............... H04B 7/0877
(Continued)

OTHER PUBLICATIONS

International Search Report and Written Opinion—PCT/US2022/072899—ISA/EPO—Sep. 26, 2022.

*Primary Examiner* — Kevin M Burd
(74) *Attorney, Agent, or Firm* — Harrity & Harrity LLP

(57) ABSTRACT

Various aspects of the present disclosure generally relate to wireless communication. In some aspects, a user equipment (UE) may receive an uplink reference signal configuration indicating antenna switching for transmitting an uplink reference signal of a first radio access technology (RAT). The UE may report a rank for a downlink communication of a second RAT, wherein the rank is in accordance with an upper bound, for the rank, associated with mitigating downlink performance degradation on the second RAT due to the antenna switching. Numerous other aspects are provided.

30 Claims, 7 Drawing Sheets

(51) Int. Cl.
    H04B 7/06         (2006.01)
    H04B 7/08         (2006.01)

(58) Field of Classification Search
    USPC ......................................................... 375/262
    See application file for complete search history.

(56)                  References Cited

U.S. PATENT DOCUMENTS

2019/0052328 A1*   2/2019   Akula ...................... H04L 5/006
2019/0356445 A1   11/2019   Manolakos
2020/0037383 A1    1/2020   Rico Alvarino et al.

* cited by examiner

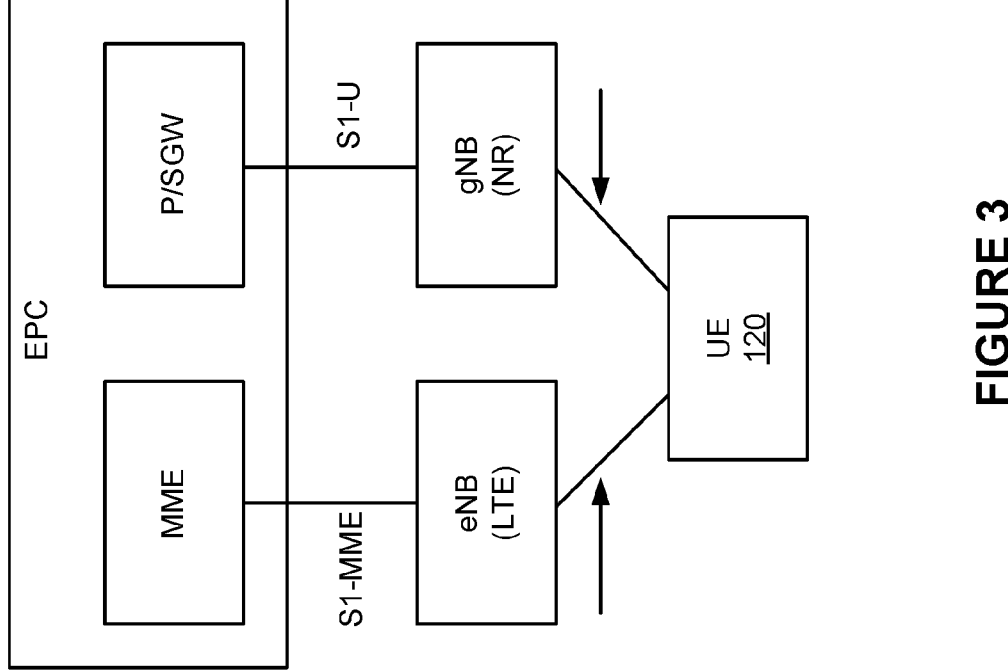
300
FIGURE 3

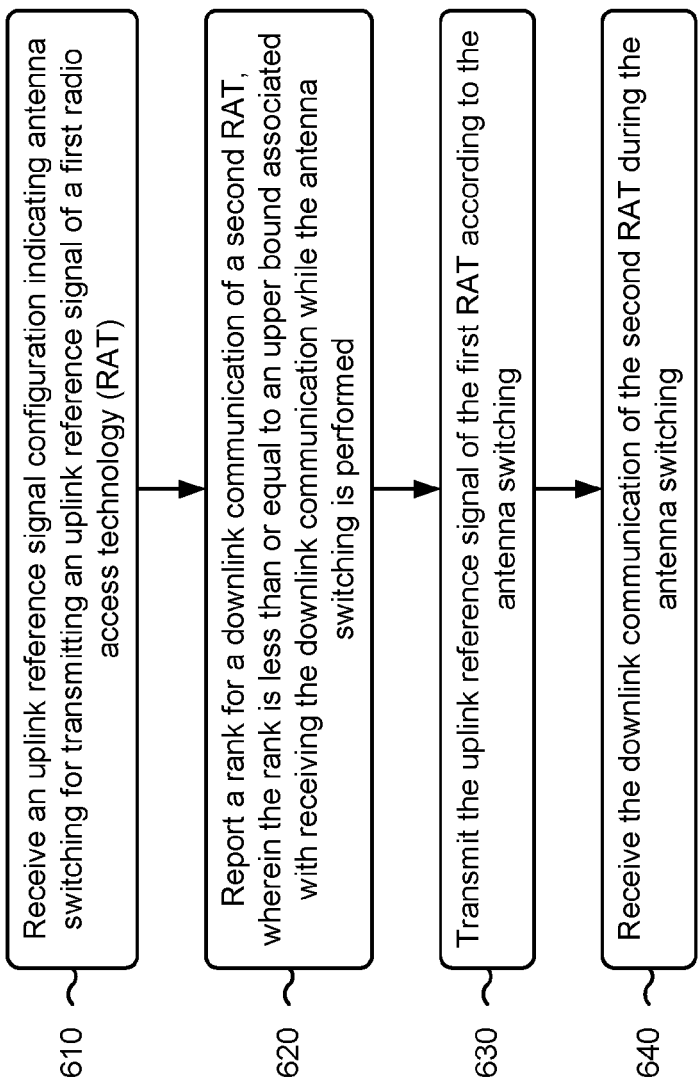

610 — Receive an uplink reference signal configuration indicating antenna switching for transmitting an uplink reference signal of a first radio access technology (RAT)

620 — Report a rank for a downlink communication of a second RAT, wherein the rank is less than or equal to an upper bound associated with receiving the downlink communication while the antenna switching is performed 630 — Transmit the uplink reference signal of the first RAT according to the antenna switching 640 — Receive the downlink communication of the second RAT during the antenna switching

RANK CONTROL FOR MITIGATING REFERENCE SIGNAL IMPACT WITH ANTENNA SHARING

CROSS-REFERENCE TO RELATED APPLICATIONS

This Patent Application is a 371 national stage of PCT Application No. PCT/US2022/072899 filed on Jun. 13, 2022, entitled "RANK CONTROL FOR MITIGATING REFERENCE SIGNAL IMPACT WITH ANTENNA SHARING," which claims priority to Indian Patent Application number 202141027293, filed on Jun. 18, 2021, entitled "RANK CONTROL FOR MITIGATING REFERENCE SIGNAL IMPACT WITH ANTENNA SHARING," and assigned to the assignee hereof. The disclosure of the prior Applications are considered part of and are incorporated by reference into this Patent Application.

FIELD OF THE DISCLOSURE

Aspects of the present disclosure generally relate to wireless communication and specifically, to techniques and apparatuses for rank control for mitigating reference signal impact with antenna sharing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A UE may receive a downlink communication in accordance with a rank. A rank identifies the number of MIMO layers included in a downlink communication. A UE may be configured to transmit reference signals (RSs), such as sounding RSs (SRSs), using one or more antennas of the UE. For example, an antenna switching scheme may be used, where antennas in use for downlink communication reception are temporarily switched for the purpose of RS transmission. If the number of MIMO layers of the downlink communication is sufficiently high, the UE may not have sufficient receive resources to receive the downlink communication while an antenna is configured for RS transmission. For example, the UE may not have enough antennas to support simultaneous RS transmission and downlink reception.

SUMMARY

Some aspects described herein relate to a method of wireless communication performed by a user equipment (UE). The method may include receiving an uplink reference signal configuration indicating antenna switching for transmitting an uplink reference signal of a first radio access technology (RAT). The method may include reporting a rank for a downlink communication of a second RAT, wherein the rank is less than or equal to an upper bound associated with receiving the downlink communication while the antenna switching is performed. The method may include transmitting the uplink reference signal of the first RAT according to the antenna switching. The method may include receiving the downlink communication of the second RAT during the antenna switching.

Some aspects described herein relate to a non-transitory computer-readable medium that stores a set of instructions for wireless communication by a UE. The set of instructions, when executed by one or more processors of the UE, may cause the UE to receive an uplink reference signal configuration indicating antenna switching for transmitting an uplink reference signal of a first RAT. The set of instructions, when executed by one or more processors of the UE, may cause the UE to report a rank for a downlink communication of a second RAT, wherein the rank is less than or equal to an upper bound associated with receiving the downlink communication while the antenna switching is performed. The set of instructions, when executed by one or more processors of the UE, may cause the UE to transmit the uplink reference signal of the first RAT according to the antenna switching. The set of instructions, when executed by one or more processors of the UE, may cause the UE to receive the downlink communication of the second RAT during the antenna switching.

Some aspects described herein relate to an apparatus for wireless communication. The apparatus may include means for receiving an uplink reference signal configuration indicating antenna switching for transmitting an uplink reference signal of a first RAT. The apparatus may include means for reporting a rank for a downlink communication of a second RAT, wherein the rank is less than or equal to an upper bound associated with receiving the downlink communication while the antenna switching is performed. The apparatus may include means for transmitting the uplink reference signal of the first RAT according to the antenna switching. The apparatus may include means for receiving the downlink communication of the second RAT during the antenna switching.

Some aspects described herein relate to a UE for wireless communication. The user equipment may include at least one processor and at least one memory, communicatively coupled with the at least one processor, that stores processor-readable code. The processor-readable code, when executed by the at least one processor, may be configured to cause the user equipment to receive an uplink reference signal configuration indicating antenna switching for transmitting an uplink reference signal of a first RAT. The processor-readable code, when executed by the at least one processor, may be configured to cause the user equipment to report a rank for a downlink communication of a second RAT, wherein the rank is less than or equal to an upper bound associated with receiving the downlink communication while the antenna switching is performed. The processor-readable code, when executed by the at least one processor, may be configured to cause the user equipment to transmit the uplink reference signal of the first RAT according to the antenna switching. The processor-readable code, when executed by the at least one processor, may be configured to cause the user equipment to receive the downlink communication of the second RAT during the antenna switching.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 3 is a diagram illustrating an example of dual connectivity in accordance with the present disclosure.

FIG. 6 is a flowchart illustrating an example process performed, for example, by a UE in accordance with the present disclosure.

DETAILED DESCRIPTION

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to facilitating downlink communication in systems using antenna switching for reference signal transmission. Some aspects more specifically relate to determining an upper bound for a reported rank (such as a rank indicator (RI)) such that the rank of a downlink communication on the Long Term Evolution (LTE) radio access technology (RAT) does not lead to unacceptable impact from the transmission of New Radio (NR) SRSs. Particular aspects of the subject matter described in this disclosure can be implemented to realize one or more of the following potential advantages. In some examples, the described techniques can be used to improve performance of LTE downlink communications in a dual connectivity mode, such as by increasing throughput and reducing communication errors.

Figure 1:
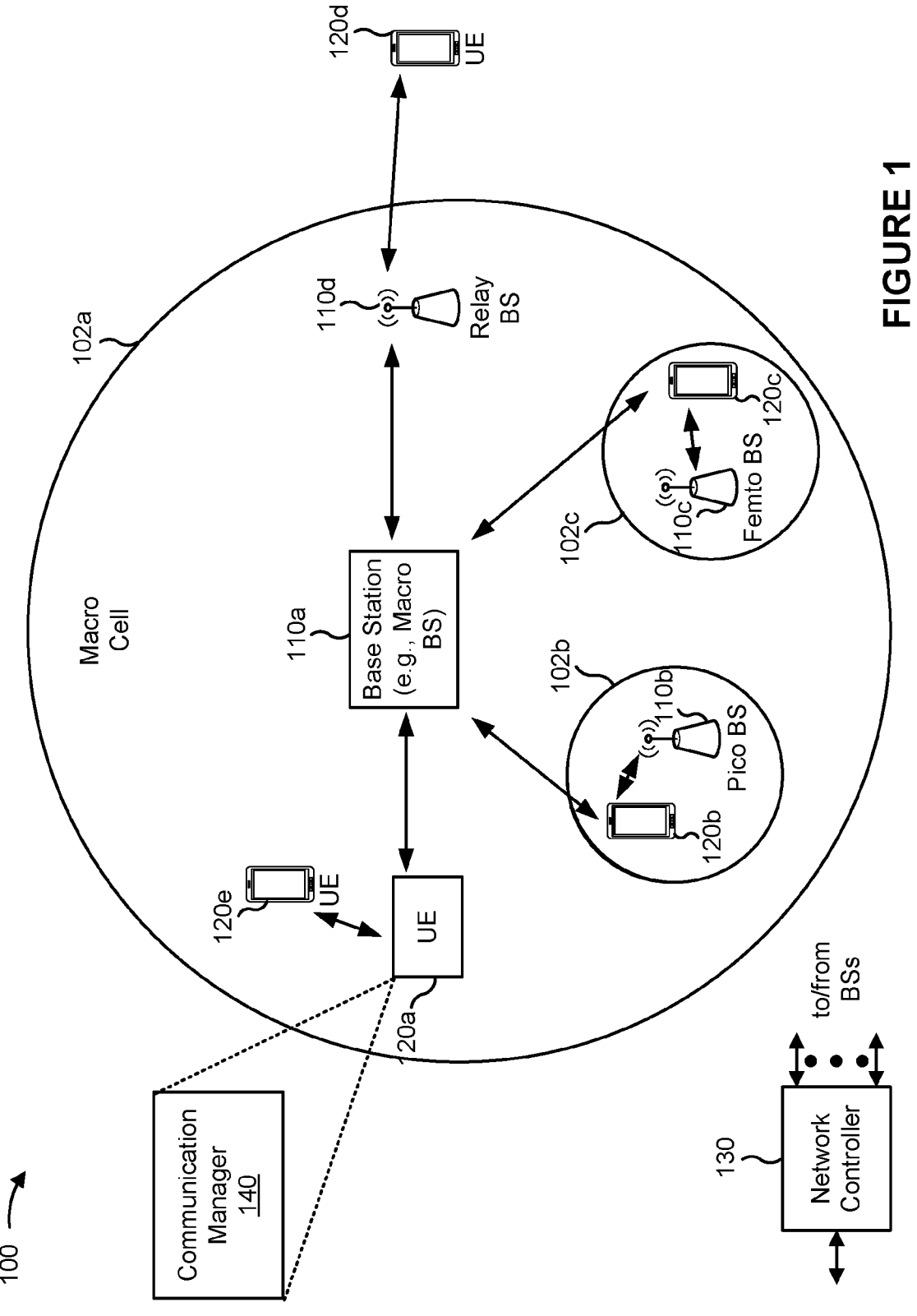
FIG. 1 is a diagram illustrating an example of a wireless network in accordance with the present disclosure.

FIG. 1 is a diagram illustrating an example of a wireless network in accordance with the present disclosure. The wireless network 100 may be or may include elements of a 5G (for example, NR) network or a 4G (for example, LTE) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHZ." if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive an uplink reference signal configuration indicating antenna switching for transmitting an uplink reference signal of a first RAT; and report a rank for a downlink communication of a second RAT, wherein the rank is in accordance with an upper bound, for the rank, associated with mitigating downlink performance degradation on the second RAT due to the antenna switching. Additionally or alternatively, the communication manager 140 may perform one or more other operations described herein.

Figure 2:
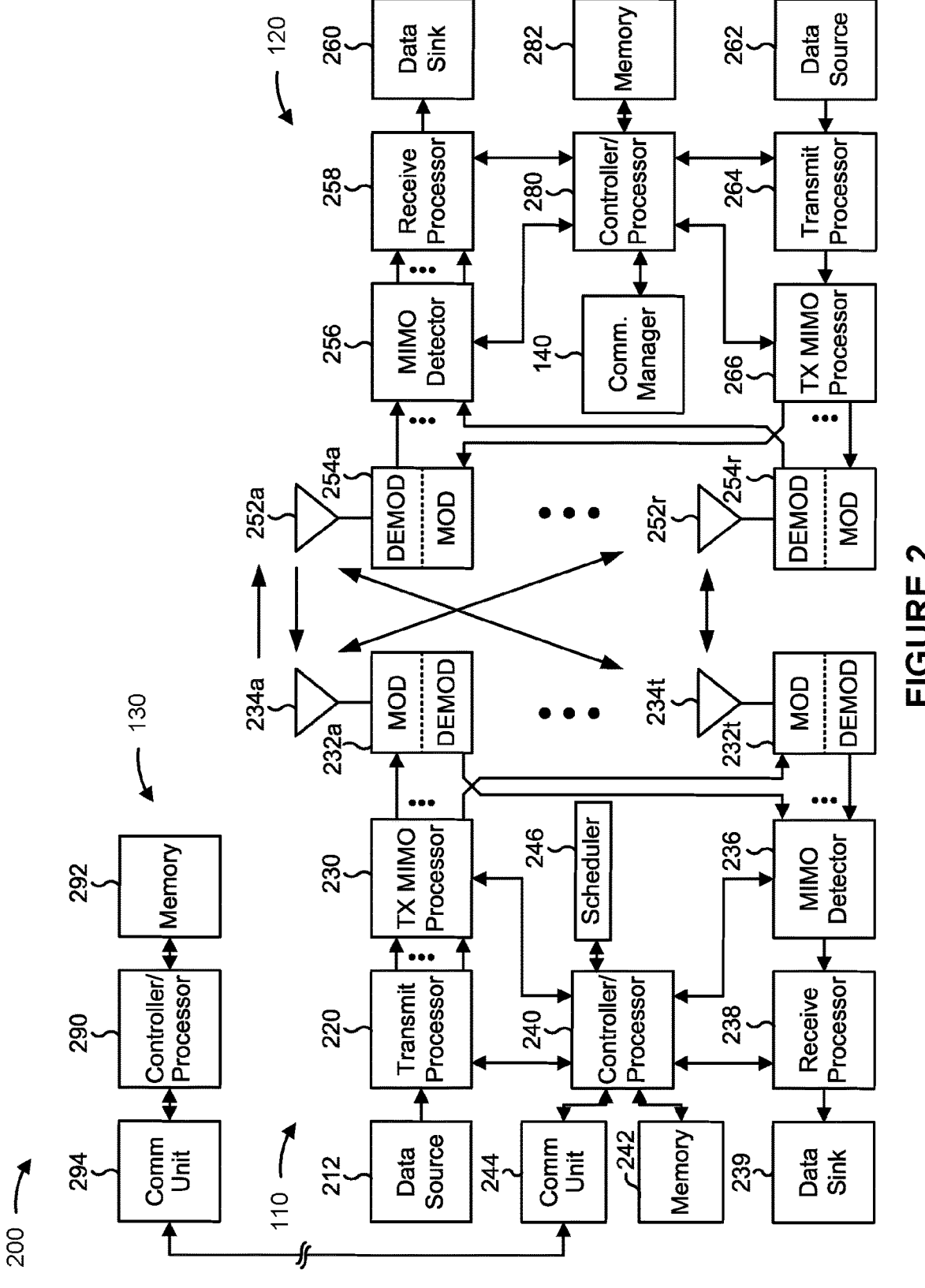
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more CQIs received from that UE 120. The UE 120 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with rank control for mitigating reference signal impact with antenna sharing, as described in more detail elsewhere herein. For example, the controller/processor 240 of the base station 110, the controller/processor 280 of the UE 120, or any other component(s) of FIG. 2 may perform or direct operations of, for example, process 600 of FIG. 6, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, or other processes as described herein. In some examples, executing instructions may include running the instructions, converting the instructions, compiling the instructions, or interpreting the instructions, among other examples.

In some aspects, the UE includes means for receiving an uplink reference signal configuration indicating antenna switching for transmitting an uplink reference signal of a first RAT; and means for reporting a rank for a downlink communication of a second RAT, wherein the rank is in accordance with an upper bound, for the rank, associated with mitigating downlink performance degradation on the second RAT due to the antenna switching. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

FIG. 3 is a diagram illustrating an example 300 of dual connectivity, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (where the MCG is associated with an LTE RAT and the SCG is associated with an NR RAT), an NR-E-UTRA dual connectivity (NEDC) mode (where the MCG is associated with an NR RAT and the SCG is associated with an LTE RAT), or another dual connectivity mode (such as one where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, or another type of dual connectivity mode.

As shown in FIG. 3, a UE 120 may communicate with both an eNB (that is, a 4G base station 110) and a gNB (that is, a 5G base station 110), and the eNB and the gNB may communicate (directly or indirectly) with a 4G/LTE core network, shown as an evolved packet core (EPC) that includes a mobility management entity (MME), a packet data network gateway (PGW), or a serving gateway (SGW). In FIG. 3, the PGW and the SGW are shown collectively as P/SGW. In some aspects, the eNB and the gNB may be co-located at the same base station 110. In some aspects, the eNB and the gNB may be included in different base stations 110, and thus may not be co-located.

As further shown in FIG. 3, in some aspects, a wireless network that permits operation in a 5G NSA mode may permit such operations using a MCG for a first RAT (such as an LTE RAT or a 4G RAT) and an SCG for a second RAT (such as an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (such as mobility, coverage, or control plane information), and the SCG may be added as additional carriers to increase throughput (such as for data traffic or user plane information). In some aspects, the gNB and the eNB may not transfer user plane information between one another. In some aspects, a UE 120 operating in a dual connectivity mode may be concurrently connected with an LTE base station 110 (an eNB) and an NR base station 110 (a gNB) (in the case of ENDC or NEDC), or may be concurrently connected with one or more base stations 110 that use the same RAT. In some aspects, the MCG may be associated with a first frequency band (such as a sub-6 GHz band or an FR1 band) and the SCG may be associated with a second frequency band (such as a millimeter wave band or an FR2 band).

The UE 120 may communicate via the MCG and the SCG using one or more radio bearers (such as data radio bearers (DRBs) or signaling radio bearers (SRBs)). For example, the UE 120 may transmit or receive data via the MCG or the SCG using one or more DRBs. Similarly, the UE 120 may transmit or receive control information (such as radio resource control (RRC) information or measurement reports) using one or more SRBs. In some aspects, a radio bearer may be dedicated to a specific cell group (for example, a radio bearer may be an MCG bearer or an SCG bearer). In some aspects, a radio bearer may be a split radio bearer. A split radio bearer may be split in the uplink or in the downlink. For example, a DRB may be split on the downlink (in which case the UE 120 may receive downlink information for the MCG or the SCG in the DRB) but not on the uplink. For example, the uplink may be non-split with a primary path to the MCG or the SCG, such that the UE 120 transmits in the uplink only on the primary path. In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

Figure 4:
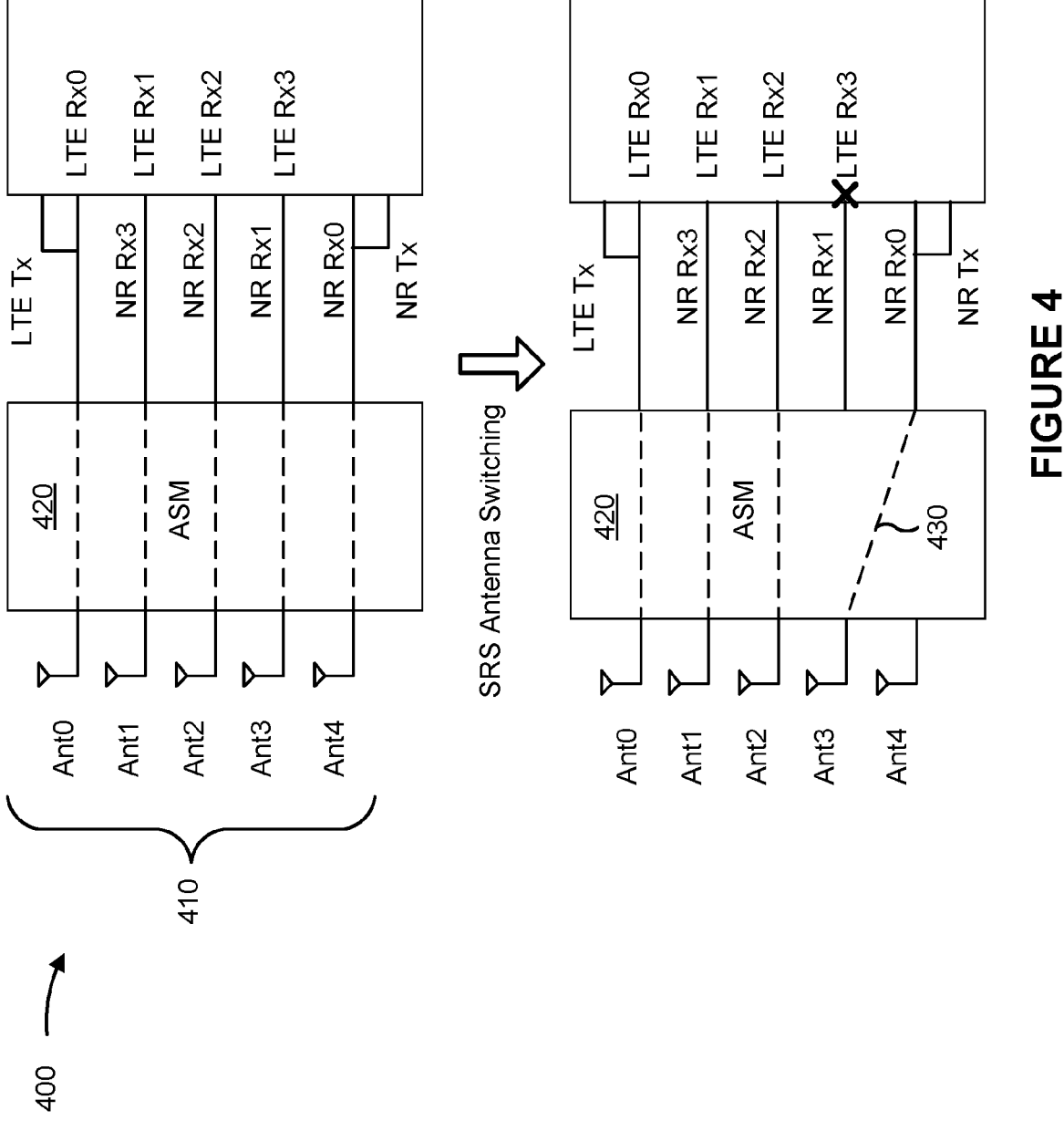
FIG. 4 is a diagram illustrating an example of antenna switching in a dual connectivity mode in accordance with the present disclosure.

FIG. 4 is a diagram illustrating an example 400 of antenna switching in a dual connectivity mode, in accordance with the present disclosure. FIG. 4 shows an example of antenna switching for a UE 120 with five antennas: a first, second, third, fourth, and fifth antenna, shown as Ant0, Ant1, Ant2, Ant3, and Ant4. In some examples, a UE 120 may have a different number of antennas, such as four antennas. FIG. 4 also shows an example of antenna switching for transmission of a sounding reference signal (SRS). In some aspects, the techniques and apparatuses described herein may be applied when a UE 120 performs antenna switching for an operation other than SRS transmission. Furthermore, although FIG. 4 shows antenna switching in a dual connectivity mode associated with an LTE RAT (more generally, a first RAT) and an NR RAT (more generally, a second RAT), operations described herein apply to other combinations of the first RAT and the second RAT.

As shown, a UE 120 may include multiple antennas 410 (for example, antennas 252, described above in connection with FIG. 2), shown as five antennas in example 400. An antenna may be used for transmission and reception of signals for one or more RATs. In example 400, Ant0 is used for transmission on an LTE RAT (shown as LTE Tx) and reception on the LTE RAT (shown as LTE Rx0). In some aspects, the transmission and reception on Ant0 are not concurrent or simultaneous. As further shown, Ant1 is used for both reception on the LTE RAT (shown as LTE Rx1) and reception on the NR RAT (shown as NR Rx3). Ant2 is used for both reception on the LTE RAT (shown as LTE Rx2) and reception on the NR RAT (shown as NR Rx2), and Ant3 is used for both reception on the LTE RAT (shown as LTE Rx3) and reception on the NR RAT (shown as NR Rx1). In some aspects, reception on different RATs is not concurrent or simultaneous. As further shown, Ant4 is used for transmission on the NR RAT (shown as NR Tx) and reception on the NR RAT (shown as NR Rx0). In some aspects, the transmission and reception on Ant4 are not concurrent or simultaneous.

In a dual connectivity mode between the LTE RAT and the NR RAT, such as an ENDC mode, both the LTE RAT and the NR RAT are active at the same time. However, to reduce UE manufacturing costs and support a small form factor, and for some band combinations, a UE 120 may not have enough antennas to dedicate (that is, orthogonalize) each antenna to only the LTE RAT or to only the NR RAT. As a result, the UE 120 may need to share antennas between the LTE RAT and the NR RAT, such that a particular antenna is used for the LTE RAT at one time and for the NR RAT at another time. This antenna sharing is particularly applicable to MIMO communications, where data is communicated simultaneously on multiple data streams (or MIMO layers), and the multiple data streams are received simultaneously by the UE 120 via different antennas.

When communicating using the NR RAT, a UE 120 may be configured to transmit SRSs to sound a channel so that a base station 110 can estimate the channel. For example, the base station 110 may perform channel estimation based at least in part on one or more SRSs received from the UE 120. The NR RAT supports a variety of SRS configurations, such as a "1T4R" configuration in which SRSs are transmitted for four NR antennas (to sound all four antennas) and a "1T2R" configuration in which SRSs are transmitted for two NR antennas (to sound two out of four antennas). For example, the UE 120 may transmit SRSs from multiple antennas serially (e.g., one antenna after another) on different subframes or symbols within an SRS period. Thus, antenna switching can occur multiple times, and multiple subframes can be impacted within an SRS period (with potentially different sets of antennas impacted in each SRS transmission). The NR RAT also supports periodic SRS transmission (configured in an RRC message) and aperiodic SRS transmission (triggered by downlink control information (DCI)).

As shown, the UE 120 may include an antenna switching module (ASM) 420. The ASM 420 may include various switches, wires, and buses that enable the ASM 420 (and the UE 120) to switch an antenna from an LTE receive chain to an NR transmit chain (or from being connected to an LTE receive chain to being open-circuited), and vice versa. A receive chain may include a set of components (such as a demodulator, a de-interleaver, a MIMO detector, an analog-to-digital converter, and a receive processor, described in connection with FIG. 2) that enable the UE 120 to process received communications from an analog form to a digital form. A transmit chain may include a set of components (such as a modulator, an interleaver, a Tx MIMO processor, a digital-to-analog converter, and a transmit processor, described in connection with FIG. 2) that enable the UE 120 to process communications for transmission, such as from a digital form to an analog form.

At 430, in example 400, the ASM 420 switches Ant3 from being connected to an LTE receive chain (shown as LTE Rx3) to an NR transmit chain (shown as NR Tx). In example 400, the ASM 420 switches Ant3 to the NR transmit chain to sound Ant3 (that is, to transmit one or more SRSs using Ant3). If Ant3 was being used to receive LTE communications (such as if Ant3 was active for LTE downlink communications), then this antenna switching of Ant3 degrades performance of downlink communications on the LTE RAT. For example, the UE 120 may fail to receive one or more downlink communications or a portion of a downlink communication (such as in one or more time domain resources, such as one or more symbols) of the LTE RAT. In some examples (such as for a sub-carrier spacing of 30 kilohertz), SRS antenna switching for NR SRS transmission may interrupt one or two downlink symbols of the LTE RAT. This may negatively impact downlink performance of the LTE RAT, such as by reducing throughput and by introducing communication errors.

Various aspects relate generally to mitigation of downlink performance degradation on the LTE RAT that is a result of antenna switching (such as for transmission of NR SRS in a dual connectivity mode, such as ENDC). Some aspects more specifically relate to determining an upper bound for a reported rank (such as an RI) such that the rank of a downlink communication on the LTE RAT does not lead to unacceptable impact from the transmission of NR SRS. Particular aspects of the subject matter described in this disclosure can be implemented to realize one or more of the following potential advantages. In some examples, the described techniques can be used to improve performance of LTE downlink communications in an ENDC mode, such as by increasing throughput and reducing communication errors.

Figure 5:
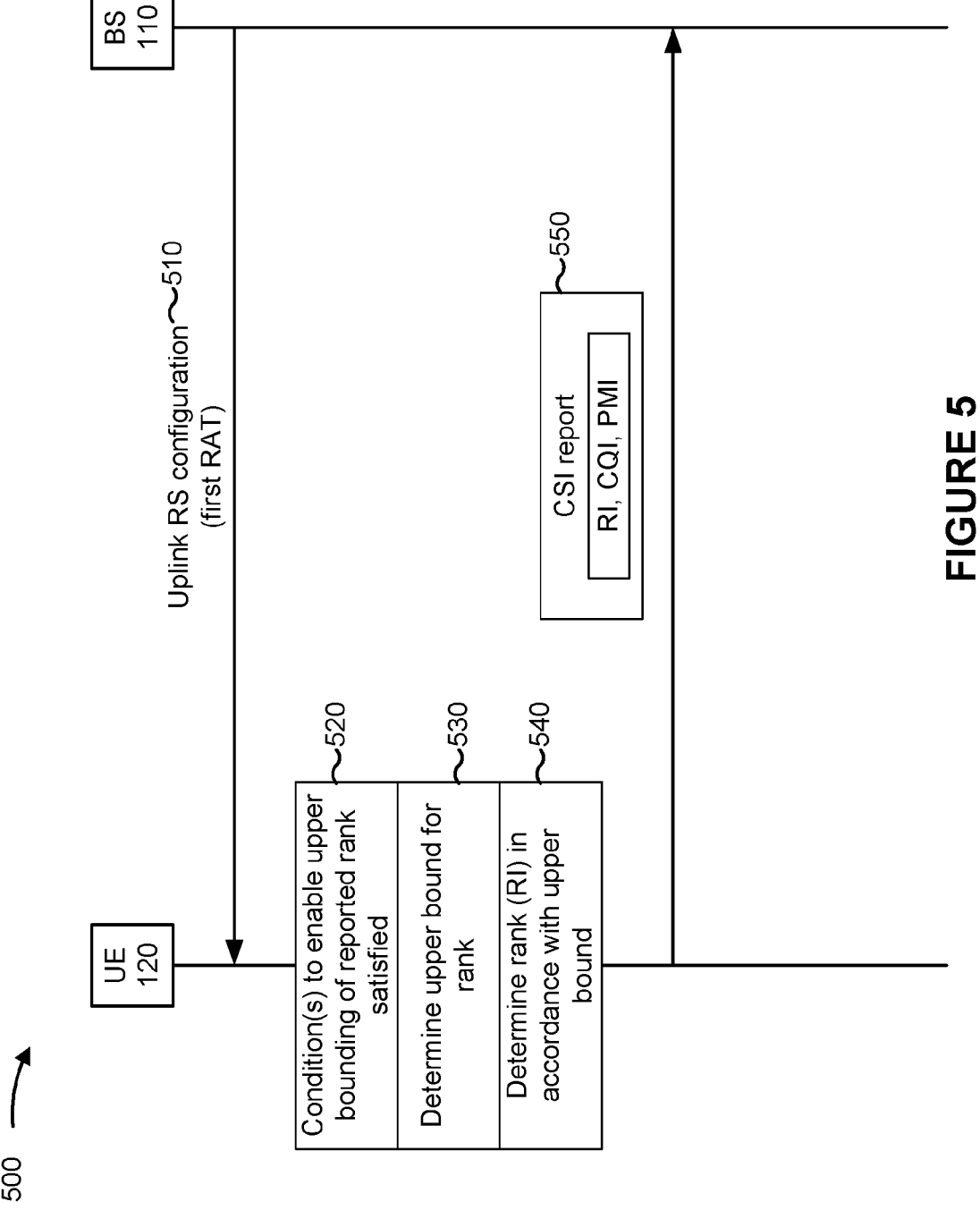
FIG. 5 is a diagram illustrating an example of signaling associated with determining a rank in accordance with an upper bound in accordance with the present disclosure.

FIG. 5 is a diagram illustrating an example 500 of signaling associated with determining a rank in accordance with an upper bound, in accordance with the present disclosure. The UE 120 of example 500 may communicate via a first RAT and a second RAT. In some aspects, the first RAT may be an NR RAT and the second RAT may be an LTE RAT. In some aspects, the UE 120 may perform the antenna switching to transmit an uplink reference signal, such as an SRS, of the first RAT. The one or more symbols and the one or more antennas may be associated with downlink communication of the second RAT. For example, the UE 120 may be scheduled to receive one or more downlink communications of the second RAT in the one or more symbols. A symbol is a time domain resource in wireless communication (in a wireless RAT, such as LTE or NR) that is a portion of a slot, which is another time domain resource in wireless communication. A subframe, which is another time domain resource, may include one or more slots. The UE 120 may be configured to receive the one or more downlink communications of the second RAT using the one or more antennas. In some aspects, the UE 120 is configured to communicate in a dual connectivity mode such as ENDC or another dual connectivity mode using the first RAT and the second RAT.

The UE 120 may receive, from the base station 110, an uplink RS configuration 510. The uplink RS configuration may be for the first RAT. For example, the uplink RS configuration may be associated with SRS transmission for the first RAT (such as NR SRS transmission). In some aspects, the uplink RS configuration may indicate a periodicity for the uplink RS, such as a periodicity of antenna switching (an NR-SRS periodicity). In some aspects, the uplink RS configuration may indicate an antenna switching scheme, such as 1T2R or 1T4R, described above.

In a first operation 520, the UE may determine that one or more conditions to enable upper bounding of a reported rank are satisfied. "Upper bounding" refers to determining a rank (that is, a value of a rank indicator) for the downlink communication on the second RAT in accordance with an upper bound for the rank. The upper bound may indicate a maximum value for a rank reported by the UE 120. The UE 120 may determine the reported rank in accordance with the maximum value, using one or more techniques described below.

In some aspects, the one or more conditions are based at least in part on a number of impacted subframes of the downlink communication of the second RAT. An impacted subframe is a subframe in which reception of one or more symbols of the downlink communication is impacted by transmission of an uplink RS.

In some aspects, the one or more conditions are based at least in part on a periodicity of the antenna switching, as identified by the uplink RS configuration 510. In some aspects, the one or more conditions are based at least in part on an antenna switching scheme of the antenna switching, as identified by the uplink RS configuration 510. In some aspects, the one or more conditions are based at least in part on an impact table. An impact table may indicate whether to perform upper bounding of the reported rank based at least in part on an impacted subframe or symbol (as described in more detail below) and a number of impacted receive chains per RS transmission (such as per NR SRS sounding). In some aspects, the one or more conditions are based at least in part on a history of a control format indicator (CFI) and scheduling on one or more impacted subframes. For example, the one or more conditions may be based at least in part on whether a CFI indicates that an impacted subframe is associated with control communication or data communication. More detail regarding the one or more conditions described above is provided below.

In some aspects, the one or more conditions are based at least in part on one or more shared channel resources of the downlink communication being impacted by the antenna switching. For example, if a number of subframes, of the second RAT, that are impacted by uplink RS transmission in a periodicity of the antenna switching, satisfies a threshold, then the UE 120 may determine to perform upper bounding. In one example, if the number of LTE subframes impacted in one overall cycle of NR-SRS transmission is greater than 0.05*NR-SRS periodicity, then the UE 120 may determine to perform upper bounding. Thus, the UE 120 may take into account an outer loop link adaptation (OLLA) block error rate (BLER) threshold of 10%, and the potential for dropping a first transmission and a first retransmission of the first retransmission (assuming a redundancy version order of 0-2-3-1), by using a scaling factor of (10%)/2=0.05.

In some aspects, the one or more conditions are based at least in part on historical information regarding a CFI. For example, if one or more physical downlink shared channel (PDSCH) symbols (determined in accordance with the CFI) are impacted by the antenna switching, then the UE 120 may determine to perform upper bounding of the rank. If only control channel symbols are impacted by the antenna switching, then the UE 120 may not perform upper bounding of the rank, since control channel decoding may be likely to succeed even if a subset of receive chains of the UE 120 are lost to RS transmission, which may not impact PDSCH performance.

In some aspects, the one or more conditions are based at least in part on scheduling, associated with the second RAT, satisfying a threshold in one or more impacted subframes. For example, if a scheduling rate (such as a ratio of scheduled resources to total available resources, a ratio of scheduled resources on impacted subframes to total available resources on impacted subframes, a number of grants, or another metric for scheduling) satisfies a threshold T_SR, then the UE 120 may determine to perform upper bounding of the rank. If there is not much scheduling on impacted subframes (as reflected by a lower scheduling rate), OLLA may not be impacted, so the UE 120 may not perform upper bounding of the rank. In some aspects, the scheduling rate may be measured in a time window, such as a last X subframes (where X is an integer) or a cycle of reference signal transmission.

In some aspects, the UE 120 may activate upper bounding if a combination of two or more of the above conditions are satisfied. For example, the UE 120 may activate upper bounding if a number of subframes of the second RAT that are impacted by uplink RS transmission in a periodicity of the antenna switching satisfies a threshold, one or more PDSCH symbols (determined in accordance with the CFI) are impacted by the antenna switching, and a scheduling rate satisfies a threshold.

In a second operation 530, the UE 120 may determine an upper bound for the rank. A rank indicates a number of MIMO layers for a downlink communication. The UE 120 may report a rank via an RI of a channel state information (CSI) report. The RI may indicate a rank selected or requested by the UE 120. For example, the UE 120 may select the rank based at least in part on channel measurements performed on a downlink RS such as a cell-specific reference signal (CRS), a channel state information reference signal (CSI-RS), or another sort of reference signal. Communication using a higher rank may require a higher number of receive antennas at the UE 120, whereas communication using a lower rank may be achievable using a lower number of receive antennas at the UE 120. Using an upper bound for the rank may reduce or eliminate the likelihood that reception of the downlink communication is hampered by antenna switching for reference signal transmission. The upper bound may ensure that a sufficient number of antennas are available for RS transmission while preserving a number of antennas, corresponding to the rank as constrained by the upper bound, for the downlink communication. For example, with a lower rank, the UE 120 may be able to decode a PDSCH successfully even if a subset of receive chains are interrupted, incurring no penalties from OLLA. As just one example, for a 20 ms SRS periodicity, with 3 LTE subframes impacted, performance may be improved at a maximum rank of 2 for a signal to noise ratio (SNR) of approximately 12 dB to approximately 30 dB (relative to a maximum rank of 3 or 4). In some aspects, the performance may be a function of, for example, a channel model, a number of RS ports available, a total number of receive antennas available, the maximum rank (that is, the upper bound), or one or more other factors.

In some aspects, the UE 120 may determine the upper bound based at least in part on a number of subframes expected to experience a failure to decode the downlink communication within a reference signal period of the uplink reference signal, a maximum rank expected to provide lower than a threshold rate of failure to decode the downlink communication within a reference signal period of the uplink reference signal, a minimum of a maximum rank expected to provide lower than a threshold rate of failure to decode the downlink communication within a reference signal period of the uplink reference signal or a number of reference signal ports for a downlink of the second RAT, or a combination thereof. For example, for an impacted subframe SF_impact on which an NR SRS impacts one or more PDSCH symbols, the total number of subframes (including initial transmission and retransmission(s)) on which PDSCH decoding fails may be considered "N_fail". N_fail may be, for example, 2 if a rank of a downlink communication exceeds the number of surviving (unimpacted) receive antennas in SF_impact and 0 otherwise. The UE 120 may sum the total number of subframes on which PDSCH decode failure is likely across all impacted subframes in an RS period: N_fail_per_SRS_period(RI)=sum(N_fail(SF_impact, RI)). The UE 120 may determine a maximum RI R' such that N_fail_per_SRS_period(R')/SRS period is less than a threshold such as 10% (10% may be selected assuming a 10% OLLA target). The UE 120 may determine the upper bound R_UB as min(R', NTx) where NTx represents the number of RS ports for the downlink communication.

In a third operation 540, the UE 120 may determine the RI in accordance with the upper bound. For example, the UE 120 may select a rank that is, at most, equal to the upper bound. Various techniques for determining the RI are described in turn below.

In some aspects, the UE 120 may identify a set of potential ranks so that the identified set of potential ranks is less than or equal to the upper bound and may select the rank from the identified set of potential ranks. For example, a CSI processing block of the UE 120 may determine the rank based at least in part on a channel measurement. The CSI processing block may select the rank from a set of potential ranks. For example, if a UE 120 is capable of supporting communication with 4 MIMO layers, the set of potential ranks may include 1, 2, 3, and 4. The UE 120 may limit the set of potential ranks from which the CSI processing block can select a rank. For example, if the upper bound is 2, then the UE 120 may limit the set of potential ranks to include only 1 and 2. Limiting the set of potential ranks may conserve processing resources relative to other techniques for selecting a rank. Furthermore, limiting the set of potential ranks may ensure that the selected rank does not exceed the upper bound, while also ensuring that PMI and CQI, which are selected jointly with the rank, align to the selected rank.

In some aspects, the UE 120 may select a set of receive antennas with a quantity equal to the upper bound. The UE 120 may perform CSI processing using the selected set of receive antennas. The rank may be determined as part of the CSI processing. For example, the UE 120 may perform CSI processing using a subset of a channel matrix and a subset of a noise covariance matrix. In some aspects, the subset of the channel matrix may be an (R_UB×NTx) subset of an (NRx×NTx) channel matrix and the subset of the noise covariance matrix may be an (R_UB×R_UB) subset of an NRx×NRx noise covariance matrix, where NRx and NTx represent the total number of Rx antennas and RS ports for the downlink communication. The UE 120 may select N1=R_UB out of NRx Rx antennas and may discard N2= (NRx−R_UB) Rx antennas. Thus, the set of receive antennas used to determine the rank includes a number of receive antennas equal to the maximum rank. The UE 120 may remove N2 rows from the channel matrix, and N2 rows and N2 columns from the noise covariance matrix. The removed rows and columns may correspond to the discarded antennas. In some aspects, the UE 120 may select the N1 antennas as follows:

Suppose A is the set of impacted subframes (per SRS period) for which at least R_UB Rx antennas survive (that is, are not used for RS transmission). In other words, the UE 120 may ignore impacted subframes which have fewer than R_UB surviving antennas, since such subframes are likely to result in a PDSCH block error irrespective of whether the upper bound is used. The UE 120 may determine the surviving antennas' indices for each impacted subframe in A. The UE 120 may select all antennas that survive in all impacted subframes in A. For example, the UE 120 may select N0 antennas at this step. To choose the remaining (N1–N0) antennas (if N0 is less than N1), the UE 120 may prioritize antennas that are surviving antennas in a larger number of impacted subframes in A, over antennas that are surviving antennas in fewer impacted subframes. Thus, the UE 120 may prioritize antennas that tend not to be interrupted by SRS transmission. If two antennas are surviving antennas in the same number of impacted subframes, the UE 120 may select an antenna associated with a highest reference signal received power (RSRP) measurement. For example, the UE 120 may prioritize antennas with higher RSRP.

This technique may prioritize, for selection and CSI processing for the purpose of determining a signaled rank, antennas that tend to survive during subframes associated with antenna switching. Thus, BLER may be reduced and throughput may be increased.

In some aspects, the UE 120 may determine the rank based at least in part on OLLA. OLLA is a technique by which the base station 110 can perform rate adaptation of the downlink communication based at least in part on feedback regarding the downlink communication. For example, the base station 110 may perform OLLA based at least in part on information such as a CQI, an RSRP, a reference signal received quality (RSRQ), a measured BLER, a history of one or more of these values, or another value. For example, the base station 110 may perform OLLA using information other than or in addition a mapping between CQI and MCS. OLLA may be based at least in part on a target BLER. A BLER identifies a ratio of blocks associated with errors in reception to total blocks transmitted. One example of a target BLER for OLLA is 10%, though other target BLERs can be used.

The UE 120 may determine a rank using one or more of the techniques described above. The UE 120 may adjust the rank based at least in part on at least one of: a first threshold for a BLER associated with OLLA, a second threshold for a signal to interference plus noise ratio (SINR) of the downlink communication, or a third threshold for an MCS of the downlink communication. In some aspects, the first threshold may be for impacted subframes. For example, the UE 120 may decrease (such as decrement) an RI if one or more of the first threshold, the second threshold, or the third threshold are satisfied. The first threshold may be a threshold for BLER on impacted subframes and retransmissions associated with impacted subframes, and, in one example, may have a value of 10%. Thus, the first threshold may be satisfied if a BLER on impacted subframes and retransmissions associated with impacted subframes exceeds 10%. The second threshold may be a threshold SINR. The second threshold may be satisfied if an SNR of the downlink communication exceeds the threshold SNR. The third threshold may be a threshold MCS, such as a threshold for an average scheduled MCS. The third threshold may be satisfied if an average scheduled MCS is below the threshold MCS. If any one or more of the first threshold, the second threshold, or the third threshold is satisfied, the UE 120 may decrement the UE 120's RI (for example, by performing CSI processing with an upper bound equal to the UE's current rank decremented by 1 (R'=(current RI–1)). If none of the first threshold, the second threshold, or the third threshold is satisfied during a time window T>T_threshold, the UE 120 may increment the UE 120's RI (for example, by performing CSI processing with an upper bound that is the minimum of the UE's current rank incremented by 1 and the UE's current upper bound). Thus, the UE 120 may perform adaptive rank control based at least in part on an OLLA BLER target, which improves adherence to BLER thresholds and improves the rate of success of downlink communications.

As shown, the UE 120 may transmit a CSI report 550. As further shown, the CSI report 550 may identify at least one of the RI (indicating the rank determined in accordance with the upper bound), a channel quality indicator (CQI), or a precoding matrix indicator (PMI). For example, the CSI processing component of the UE 120 may determine the CQI or the PMI, and the UE 120 may report the CQI or the PMI as part of the CSI report. In some aspects, the UE 120 may receive a downlink communication associated with a rank corresponding to the reported RI. In some aspects, the UE 120 may transmit one or more RSs in accordance with the uplink RS configuration 510. In this way, impact on the downlink communication due to antenna switching for uplink RS transmission is mitigated by imposing an upper bound on the rank that can be selected by the UE 120.

FIG. 6 is a flowchart illustrating an example process 600 performed, for example, by a UE in accordance with the present disclosure. Example process 600 is an example where the UE (for example, UE 120, or an apparatus of a UE) performs operations associated with rank control for mitigating reference signal impact with antenna sharing.

As shown in FIG. 6, in some aspects, process 600 may include receiving an uplink reference signal configuration indicating antenna switching for transmitting an uplink reference signal of a first RAT (block 610). For example, the UE (such as by using communication manager 140 or reception component 702, depicted in FIG. 7) may receive an uplink reference signal configuration indicating antenna switching for transmitting an uplink reference signal of a first RAT, as described above.

As further shown in FIG. 6, in some aspects, process 600 may include reporting a rank for a downlink communication of a second RAT, wherein the rank is less than or equal to an upper bound associated with receiving the downlink communication while the antenna switching is performed (block 620). For example, the UE (such as by using communication manager 140 or CSI processing component 708, depicted in FIG. 7) may report a rank for a downlink communication of a second RAT. In some aspects, the rank is less than or equal to an upper bound associated with receiving the downlink communication while the antenna switching is performed. In some aspects, the rank is in accordance with an upper bound, for the rank, associated with mitigating downlink performance degradation on the second RAT due to the antenna switching, as described above.

As further shown in FIG. 6, in some aspects, process 600 may include transmitting the uplink reference signal of the first RAT according to the antenna switching (block 630). For example, the UE (such as by using communication manager 140 or transmission component 704, depicted in FIG. 7) may transmit one or more SRSs of the first RAT according to the antenna switching (such as using an antenna switching scheme defined by an uplink RS configuration of the one or more SRSs).

As further shown in FIG. 6, in some aspects, process 600 may include receiving the downlink communication of the second RAT during the antenna switching (block 640). For example, the UE (such as by using communication manager 140 or reception component 702, depicted in FIG. 7) may receive the downlink communication of the second RAT during the antenna switching, as described above.

Process 600 may include additional aspects, such as any single aspect or any combination of aspects described below or in connection with one or more other processes described elsewhere herein.

In a first additional aspect, reporting the rank in accordance with the upper bound is based at least in part on at least one of a periodicity of the antenna switching, an antenna switching scheme of the uplink reference signal, an impacted time resource of the second RAT, a number of impacted receive chains per transmission of the uplink reference signal, which receive chains, of a set of receive chains of the UE, are impacted by transmission of the uplink reference signal, or historical information regarding a control format indicator or scheduling on impacted subframes.

In a second additional aspect, alone or in combination with the first aspect, process 600 includes determining that a number of impacted subframes, of the downlink communication of the second RAT, satisfy a threshold with regard to a periodicity of the antenna switching, wherein reporting the rank in accordance with the upper bound is based at least in part on determining that the number of impacted subframes satisfy the threshold.

In a third additional aspect, alone or in combination with one or more of the first and second aspects, process 600 includes determining that one or more shared channel resources of the downlink communication are impacted by the antenna switching, wherein reporting the rank in accordance with the upper bound is based at least in part on the one or more shared channel resources of the downlink communication being impacted by the antenna switching.

In a fourth additional aspect, alone or in combination with one or more of the first through third aspects, process 600 includes determining that scheduling of shared channel symbols, associated with the second RAT, satisfies a threshold in one or more impacted subframes, wherein reporting the rank in accordance with the upper bound is based at least in part on the scheduling of the shared channel symbols satisfying the threshold.

In a fifth additional aspect, alone or in combination with one or more of the first through fourth aspects, process 600 includes determining the upper bound.

In a sixth additional aspect, alone or in combination with one or more of the first through fifth aspects, process 600 includes determining the upper bound based at least in part on a number of subframes expected to experience a decoding failure within a reference signal period of the uplink reference signal.

In a seventh additional aspect, alone or in combination with one or more of the first through sixth aspects, process 600 includes determining the upper bound based at least in part on a maximum rank expected to provide lower than a threshold decoding failure rate within a reference signal period of the uplink reference signal.

In an eighth additional aspect, alone or in combination with one or more of the first through seventh aspects, further comprising determining the upper bound based at least in part on a minimum of a maximum rank expected to provide lower than a threshold rate of failure to decode the downlink communication within a reference signal period of the uplink reference signal, or a number of reference signal ports for a downlink of the second RAT.

In a ninth additional aspect, alone or in combination with one or more of the first through eighth aspects, process 600 includes identifying a set of potential ranks so that the set of potential ranks includes a number of ranks less than or equal to the upper bound, and selecting the rank from the identified set of potential ranks.

In a tenth additional aspect, alone or in combination with one or more of the first through ninth aspects, process 600 includes selecting a set of receive antennas having a quantity equal to the upper bound, and performing CSI processing using the selected set of receive antennas, wherein the rank is determined as part of the CSI processing.

In an eleventh additional aspect, alone or in combination with one or more of the first through tenth aspects, selecting the set of receive antennas further comprises selecting one or more receive antennas, of the set of receive antennas, based at least in part on the one or more receive antennas being non-impacted in each impacted subframe of a reference signal period of the uplink reference signal.

In a twelfth additional aspect, alone or in combination with one or more of the first through eleventh aspects, selecting the set of receive antennas further comprises selecting a first receive antenna, of the set of receive antennas, based at least in part on the first receive antenna being non-impacted in more impacted subframes of a reference signal period of the uplink reference signal than a second receive antenna.

In a thirteenth additional aspect, alone or in combination with one or more of the first through twelfth aspects, selecting the set of receive antennas further comprises selecting a first receive antenna, of the set of receive antennas, based at least in part on the first receive antenna being non-impacted in a same number of impacted subframes of a reference signal period of the uplink reference signal as a second receive antenna, and based at least in part on the first receive antenna being associated with a higher metric than the second receive antenna.

In a fourteenth additional aspect, alone or in combination with one or more of the first through thirteenth aspects, process 600 includes determining whether a threshold for a BLER associated with OLLA on impacted subframes is satisfied, wherein the rank is based at least in part on whether the BLER associated with OLLA satisfies the threshold.

In a fifteenth additional aspect, alone or in combination with one or more of the first through fourteenth aspects, the threshold is a first threshold, and wherein the rank is further based at least in part on whether a signal-to-noise ratio of the downlink communication satisfies a second threshold and whether an average scheduled modulation and coding scheme of the downlink communication satisfies a third threshold.

In a sixteenth additional aspect, alone or in combination with one or more of the first through fifteenth aspects, process 600 includes decreasing the rank based at least in part on at least one of the first threshold being satisfied, or the second threshold and the third threshold being satisfied.

In a seventeenth additional aspect, alone or in combination with one or more of the first through sixteenth aspects, process 600 includes increasing the rank based at least in part on the first threshold not being satisfied for a length of time, and the second threshold or the third threshold not being satisfied for a length of time.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
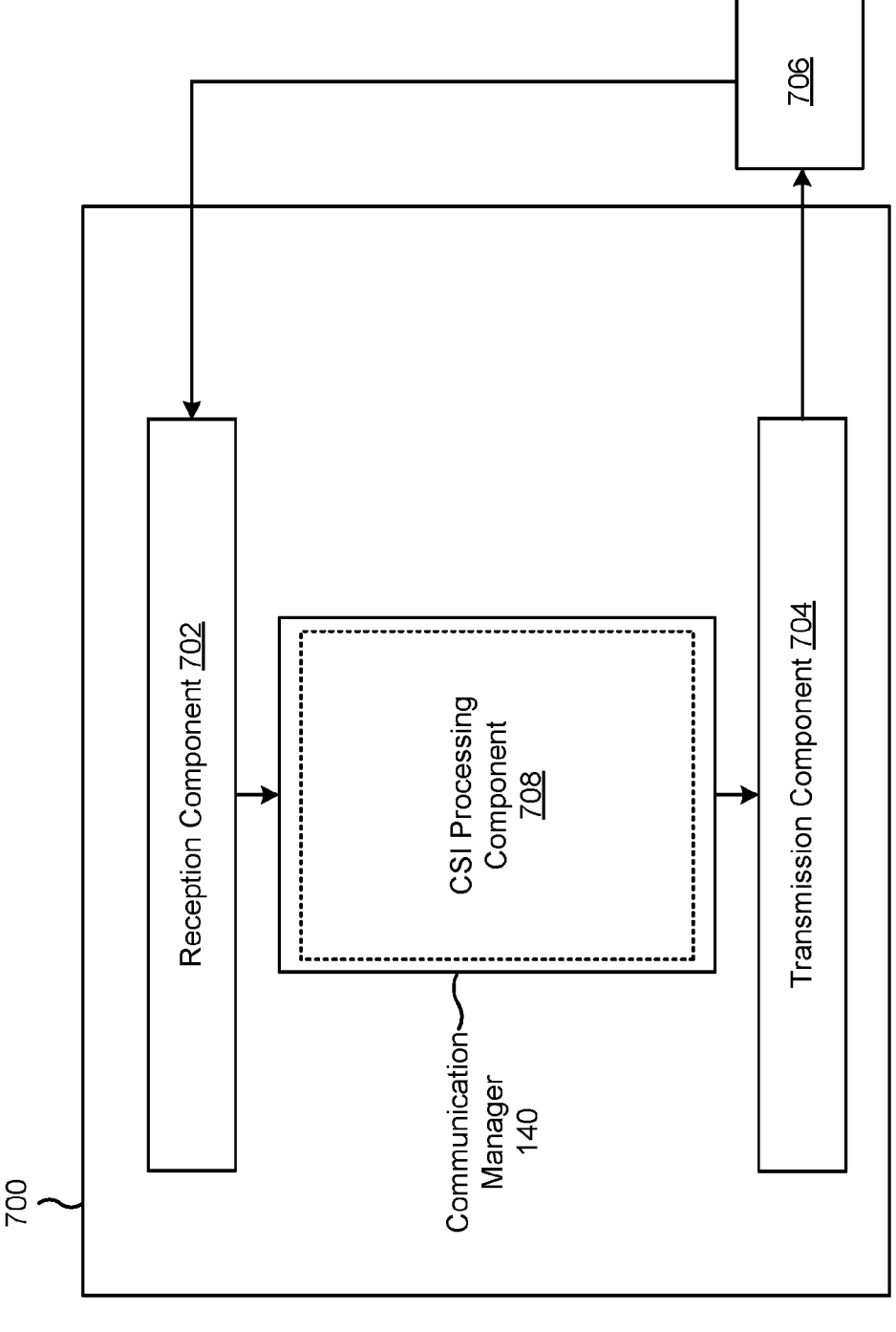
FIG. 7 is a diagram of an example apparatus for wireless communication in accordance with the present disclosure.

FIG. 7 is a diagram of an example apparatus 700 for wireless communication in accordance with the present disclosure. The apparatus 700 may be a UE, or a UE may include the apparatus 700. In some aspects, the apparatus 700 includes a reception component 702, a transmission component 704, and a communication manager 140, which may be in communication with one another (for example, via one or more buses). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIGS. 3-5. Additionally or alternatively, the apparatus 700 may be configured to perform one or more processes described herein, such as process 600 of FIG. 6 or a combination thereof. In some aspects, the apparatus 700 may include one or more components of the UE described above in connection with FIG. 2.

The reception component 702 may receive communications, such as reference signals, control information, data communications, or a combination thereof, from the apparatus 706. The reception component 702 may provide received communications to one or more other components of the apparatus 700, such as the communication manager 140. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a modem, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, the communication manager 140 may generate communications and may transmit the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The communication manager 140 may receive or may cause the reception component 702 to receive an uplink reference signal configuration indicating antenna switching for transmitting an uplink reference signal of a first RAT. The communication manager 140 may report a rank for a downlink communication of a second RAT, wherein the rank is in accordance with an upper bound, for the rank, associated with mitigating downlink performance degradation on the second RAT due to the antenna switching. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a CSI processing component 708. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive an uplink reference signal configuration indicating antenna switching for transmitting an uplink reference signal of a first RAT. The CSI processing component 708 may report (e.g., select, calculate, determine) a rank for a downlink communication of a second RAT, wherein the rank is in accordance with an upper bound, for the rank, associated with mitigating downlink performance degradation on the second RAT due to the antenna switching.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving an uplink reference signal configuration indicating antenna switching for transmitting an uplink reference signal of a first radio access technology (RAT); reporting a rank for a downlink communication of a second RAT, wherein the rank is less than or equal to an upper bound associated with receiving the downlink communication while the antenna switching is performed; transmitting the uplink reference signal of the first RAT according to the antenna switching; and receiving the downlink communication of the second RAT during the antenna switching.

Aspect 2: The method of Aspect 1, wherein reporting the rank in accordance with the upper bound is based at least in part on at least one of: a periodicity of the antenna switching, an antenna switching scheme of the uplink reference signal, an impacted time resource of the second RAT, a number of impacted receive chains per transmission of the uplink reference signal, which receive chains, of a set of receive chains of the UE, are impacted by transmission of the uplink reference signal, or historical information regarding a control format indicator or scheduling on impacted subframes.

Aspect 3: The method of any of Aspects 1-2, further comprising: determining that a number of impacted subframes, of the downlink communication of the second RAT, satisfy a threshold with regard to a periodicity of the antenna switching, wherein reporting the rank in accordance with the upper bound is based at least in part on determining that the number of impacted subframes satisfy the threshold.

Aspect 4: The method of any of Aspects 1-3, further comprising: determining that one or more shared channel resources of the downlink communication are impacted by the antenna switching, wherein reporting the rank in accordance with the upper bound is based at least in part on the one or more shared channel resources of the downlink communication being impacted by the antenna switching.

Aspect 5: The method of any of Aspects 1-4, further comprising: determining that scheduling of shared channel symbols, associated with the second RAT, satisfies a threshold in one or more impacted subframes, wherein reporting the rank in accordance with the upper bound is based at least in part on the scheduling of the shared channel symbols satisfying the threshold.

Aspect 6: The method of any of Aspects 1-5, further comprising determining the upper bound.

Aspect 7: The method of any of Aspects 1-6, further comprising determining the upper bound based at least in part on a number of subframes expected to experience a decoding failure within a reference signal period of the uplink reference signal.

Aspect 8: The method of any of Aspects 1-7, further comprising determining the upper bound based at least in part on a maximum rank expected to provide lower than a threshold decoding failure rate within a reference signal period of the uplink reference signal.

Aspect 9: The method of any of Aspects 1-8, further comprising determining the upper bound based at least in part on a minimum of: a maximum rank expected to provide lower than a threshold rate of failure to decode the downlink communication within a reference signal period of the uplink reference signal, or a number of reference signal ports for a downlink of the second RAT.

Aspect 10: The method of any of Aspects 1-9, further comprising: identifying a set of potential ranks such that the set of potential ranks includes ranks less than or equal to the upper bound; and selecting the rank from the identified set of potential ranks.

Aspect 11: The method of any of Aspects 1-10, further comprising: selecting a set of receive antennas having a quantity equal to the upper bound; and performing channel state information (CSI) processing using the selected set of receive antennas, wherein the rank is determined as part of the CSI processing.

Aspect 12: The method of Aspect 11, wherein selecting the set of receive antennas further comprises selecting one or more receive antennas, of the set of receive antennas, based at least in part on the one or more receive antennas being non-impacted in each impacted subframe of a reference signal period of the uplink reference signal.

Aspect 13: The method of Aspect 11, wherein selecting the set of receive antennas further comprises selecting a first receive antenna, of the set of receive antennas, based at least in part on the first receive antenna being non-impacted in more impacted subframes of a reference signal period of the uplink reference signal than a second receive antenna.

Aspect 14: The method of Aspect 11, wherein selecting the set of receive antennas further comprises selecting a first receive antenna, of the set of receive antennas, based at least in part on the first receive antenna being non-impacted in a same number of impacted subframes of a reference signal period of the uplink reference signal as a second receive antenna, and based at least in part on the first receive antenna being associated with a higher metric than the second receive antenna.

Aspect 15: The method of any of Aspects 1-14, further comprising determining whether a threshold for a block error rate (BLER) associated with outer loop link adaptation (OLLA) on impacted subframes is satisfied, wherein the rank is based at least in part on whether the BLER associated with OLLA satisfies the threshold.

Aspect 16: The method of Aspect 15, wherein the threshold is a first threshold, and wherein the rank is further based at least in part on whether a signal-to-noise ratio of the downlink communication satisfies a second threshold and whether an average scheduled modulation and coding scheme of the downlink communication satisfies a third threshold.

Aspect 17: The method of Aspect 16, further comprising decreasing the rank based at least in part on at least one of: the first threshold being satisfied, or the second threshold and the third threshold being satisfied.

Aspect 18: The method of Aspect 16, further comprising increasing the rank based at least in part on: the first threshold not being satisfied for a length of time, and the second threshold or the third threshold not being satisfied for a length of time.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
at least one processor; and at least one memory communicatively coupled with the at least one processor and storing processor-readable code that, when executed by the at least one processor, is configured to cause the UE to:
receive an uplink reference signal configuration indicating antenna switching for transmitting an uplink reference signal of a first radio access technology (RAT);
report a rank for a downlink communication of a second RAT, wherein the rank is less than or equal to an upper bound associated with receiving the downlink communication while the antenna switching is performed;
transmit the uplink reference signal of the first RAT according to the antenna switching; and
receive the downlink communication of the second RAT during the antenna switching.

2. The UE of claim 1, wherein reporting the rank in accordance with the upper bound is based at least in part on at least one of:
a periodicity of the antenna switching,
an antenna switching scheme of the uplink reference signal,
an impacted time resource of the second RAT,
a number of impacted receive chains per transmission of the uplink reference signal,
which receive chains, of a set of receive chains of the UE, are impacted by transmission of the uplink reference signal, or
historical information regarding a control format indicator or scheduling on impacted subframes.

3. The UE of claim 1, wherein the at least one memory further stores processor-readable code configured to cause the UE to:
determine that a number of impacted subframes, of the downlink communication of the second RAT, satisfy a threshold with regard to a periodicity of the antenna switching, wherein reporting the rank in accordance with the upper bound is based at least in part on determining that the number of impacted subframes satisfy the threshold.

4. The UE of claim 1, wherein the at least one memory further stores processor-readable code configured to cause the UE to:
determine that one or more shared channel resources of the downlink communication are impacted by the antenna switching, wherein reporting the rank in accordance with the upper bound is based at least in part on the one or more shared channel resources of the downlink communication being impacted by the antenna switching.

5. The UE of claim 1, wherein the at least one memory further stores processor-readable code configured to cause the UE to:
determine that scheduling of shared channel symbols, associated with the second RAT, satisfies a threshold in one or more impacted subframes, wherein reporting the rank in accordance with the upper bound is based at least in part on the scheduling of the shared channel symbols satisfying the threshold.

6. The UE of claim 1, wherein the at least one memory further stores processor-readable code configured to cause the UE to determine the upper bound based at least in part on a number of subframes expected to experience a decoding failure within a reference signal period of the uplink reference signal.

7. The UE of claim 1, wherein the at least one memory further stores processor-readable code configured to cause the UE to determine the upper bound based at least in part on a maximum rank expected to provide lower than a threshold decoding failure rate within a reference signal period of the uplink reference signal.

8. The UE of claim 1, wherein the at least one memory further stores processor-readable code configured to cause the UE to determine the upper bound based at least in part on a minimum of:

a maximum rank expected to provide lower than a threshold rate of failure to decode the downlink communication within a reference signal period of the uplink reference signal, or a number of reference signal ports for a downlink of the second RAT.

9. The UE of claim 1, wherein the at least one memory further stores processor-readable code configured to cause the UE to:

identify a set of potential ranks such that the set of potential ranks includes ranks less than or equal to the upper bound; and select the rank from the identified set of potential ranks.

10. The UE of claim 1, wherein the at least one memory further stores processor-readable code configured to cause the UE to:

select a set of receive antennas having a quantity equal to the upper bound; and perform channel state information (CSI) processing using the selected set of receive antennas, wherein the rank is determined as part of the CSI processing.

11. The UE of claim 10, wherein, to cause the UE to select the set of receive antennas, the processor-readable code, when executed by the at least one processor, is configured to cause the UE to select one or more receive antennas, of the set of receive antennas, based at least in part on the one or more receive antennas being non-impacted in each impacted subframe of a reference signal period of the uplink reference signal.

12. The UE of claim 10, wherein, to cause the UE to select the set of receive antennas, the processor-readable code, when executed by the at least one processor, is configured to cause the UE to select a first receive antenna, of the set of receive antennas, based at least in part on the first receive antenna being non-impacted in more impacted subframes of a reference signal period of the uplink reference signal than a second receive antenna.

13. The UE of claim 10, wherein, to cause the UE to select the set of receive antennas, the processor-readable code, when executed by the at least one processor, is configured to cause the UE to select a first receive antenna, of the set of receive antennas, based at least in part on the first receive antenna being non-impacted in a same number of impacted subframes of a reference signal period of the uplink reference signal as a second receive antenna, and based at least in part on the first receive antenna being associated with a higher metric than the second receive antenna.

14. The UE of claim 1, wherein the at least one memory further stores processor-readable code configured to cause the UE to determine whether a threshold for a block error rate (BLER) associated with outer loop link adaptation (OLLA) on impacted subframes is satisfied, wherein the rank is based at least in part on whether the BLER associated with OLLA satisfies the threshold.

15. The UE of claim 14, wherein the threshold is a first threshold, and wherein the rank is further based at least in part on whether a signal-to-noise ratio of the downlink communication satisfies a second threshold and whether an average scheduled modulation and coding scheme of the downlink communication satisfies a third threshold.

16. The UE of claim 15, wherein the at least one memory further stores processor-readable code configured to cause the UE to decrease the rank based at least in part on at least one of:

the first threshold being satisfied, or the second threshold and the third threshold being satisfied.

17. The UE of claim 15, wherein the at least one memory further stores processor-readable code configured to cause the UE to increase the rank based at least in part on:

the first threshold not being satisfied for a length of time, and the second threshold or the third threshold not being satisfied for a length of time.

18. A method of wireless communication performed by a user equipment (UE), comprising:

receiving an uplink reference signal configuration indicating antenna switching for transmitting an uplink reference signal of a first radio access technology (RAT);

reporting a rank for a downlink communication of a second RAT, wherein the rank is less than or equal to an upper bound associated with receiving the downlink communication while the antenna switching is performed;

transmitting the uplink reference signal of the first RAT according to the antenna switching; and receiving the downlink communication of the second RAT during the antenna switching.

19. The method of claim 18, wherein reporting the rank in accordance with the upper bound is based at least in part on at least one of:

a periodicity of the antenna switching, an antenna switching scheme of the uplink reference signal, an impacted time resource of the second RAT, a number of impacted receive chains per transmission of the uplink reference signal, which receive chains, of a set of receive chains of the UE, are impacted by transmission of the uplink reference signal, or historical information regarding a control format indicator or scheduling on impacted subframes.

20. The method of claim 18, further comprising:

determining that a number of impacted subframes, of the downlink communication of the second RAT, satisfy a threshold with regard to a periodicity of the antenna switching, wherein reporting the rank in accordance with the upper bound is based at least in part on determining that the number of impacted subframes satisfy the threshold.

21. The method of claim 18, further comprising:

determining that one or more shared channel resources of the downlink communication are impacted by the antenna switching, wherein reporting the rank in accordance with the upper bound is based at least in part on the one or more shared channel resources of the downlink communication being impacted by the antenna switching.

22. The method of claim 18, further comprising:

determining that scheduling of shared channel symbols, associated with the second RAT, satisfies a threshold in one or more impacted subframes, wherein reporting the rank in accordance with the upper bound is based at least in part on the scheduling of the shared channel symbols satisfying the threshold.

23. The method of claim 18, further comprising determining the upper bound based at least in part on a number of subframes expected to experience a decoding failure within a reference signal period of the uplink reference signal.

24. The method of claim 18, further comprising determining the upper bound based at least in part on a maximum rank expected to provide lower than a threshold decoding failure rate within a reference signal period of the uplink reference signal.

25. The method of claim 18, further comprising determining the upper bound based at least in part on a minimum of:
    a maximum rank expected to provide lower than a threshold rate of failure to decode the downlink communication within a reference signal period of the uplink reference signal, or
    a number of reference signal ports for a downlink of the second RAT.

26. The method of claim 18, further comprising:
    identifying a set of potential ranks such that the set of potential ranks includes ranks less than or equal to the upper bound; and
    selecting the rank from the identified set of potential ranks.

27. A non-transitory computer-readable medium storing a set of instructions for wireless communication, the set of instructions comprising:
    one or more instructions that, when executed by one or more processors of a user equipment (UE), cause the UE to:
        receive an uplink reference signal configuration indicating antenna switching for transmitting an uplink reference signal of a first radio access technology (RAT);
        report a rank for a downlink communication of a second RAT, wherein the rank is less than or equal to an upper bound associated with receiving the downlink communication while the antenna switching is performed;
        transmit the uplink reference signal of the first RAT according to the antenna switching; and
        receive the downlink communication of the second RAT during the antenna switching.

28. The non-transitory computer-readable medium of claim 27, wherein reporting the rank in accordance with the upper bound is based at least in part on at least one of:
    a periodicity of the antenna switching,
    an antenna switching scheme of the uplink reference signal,
    an impacted time resource of the second RAT,
    a number of impacted receive chains per transmission of the uplink reference signal,
    which receive chains, of a set of receive chains of the UE, are impacted by transmission of the uplink reference signal, or
    historical information regarding a control format indicator or scheduling on impacted subframes.

29. An apparatus for wireless communication, comprising:
    means for receiving an uplink reference signal configuration indicating antenna switching for transmitting an uplink reference signal of a first radio access technology (RAT);
    means for reporting a rank for a downlink communication of a second RAT, wherein the rank is less than or equal to an upper bound associated with receiving the downlink communication while the antenna switching is performed;
    means for transmitting the uplink reference signal of the first RAT according to the antenna switching; and
    means for receiving the downlink communication of the second RAT during the antenna switching.

30. The apparatus of claim 29, wherein reporting the rank in accordance with the upper bound is based at least in part on at least one of:
    a periodicity of the antenna switching,
    an antenna switching scheme of the uplink reference signal,
    an impacted time resource of the second RAT,
    a number of impacted receive chains per transmission of the uplink reference signal,
    which receive chains, of a set of receive chains of the UE, are impacted by transmission of the uplink reference signal, or
    historical information regarding a control format indicator or scheduling on impacted subframes.

* * * * *